US010202148B2

(12) United States Patent
Schaake et al.

(10) Patent No.: US 10,202,148 B2
(45) Date of Patent: Feb. 12, 2019

(54) LIGHTWEIGHT STEERING KNUCKLE

(71) Applicant: AKTIEBOLAGET SKF, Göteborg (SE)

(72) Inventors: Richard Schaake, Utrecht (NL); Edo Schramm, The Hague (NL); Cornelius Petrus Antonius Vissers, Den Dungen (NL); Marc Gomez, Ojersjo (SE); Gilbert Peters, Utrecht (NL)

(73) Assignee: Aktiebolaget SKF, Göteborg (SE)

(*) Notice: Subject to any disclaimer, the term of this patent is extended or adjusted under 35 U.S.C. 154(b) by 474 days.

(21) Appl. No.: 14/895,934

(22) PCT Filed: Jun. 6, 2014

(86) PCT No.: PCT/EP2014/061882
§ 371 (c)(1),
(2) Date: Dec. 4, 2015

(87) PCT Pub. No.: WO2014/195481
PCT Pub. Date: Dec. 11, 2014

(65) Prior Publication Data
US 2016/0121927 A1 May 5, 2016

(30) Foreign Application Priority Data

Jun. 7, 2013 (WO) ............... PCT/EP2013/061790

(51) Int. Cl.
B62D 7/18 (2006.01)
B60B 27/00 (2006.01)
(Continued)

(52) U.S. Cl.
CPC .............. B62D 7/18 (2013.01); B29C 70/845 (2013.01); B60B 5/02 (2013.01); B60B 27/00 (2013.01);
(Continued)

(58) Field of Classification Search
CPC .................. B62D 7/18; B60G 2206/50; B60G 2206/7101
(Continued)

(56) References Cited

U.S. PATENT DOCUMENTS 8,870,488 B2 * 10/2014 Horwitz ................... A47C 5/04
403/265
9,834,250 B2 * 12/2017 Peters ...................... B62D 7/18
(Continued)

FOREIGN PATENT DOCUMENTS

DE 102007053120 A1 5/2009
EP 1070604 A1 1/2001
(Continued)

Primary Examiner — Ruth Ilan
(74) Attorney, Agent, or Firm — Bryan Peckjian; SKF USA Inc. Patent Dept.

(57) ABSTRACT

A steering knuckle comprising a bearing connection interface (formed by a sleeve element) for connecting a wheel bearing to the steering knuckle and further connection interfaces (formed by a bracket for connection of a ball joint) for connecting the steering knuckle to an upper and lower vehicle suspension control arm. A sleeve element bore is adapted to one of receive a wheel bearing outer ring or serve as the outer ring. The sleeve element and the bracket are joined by a composite body comprising a fiber-reinforced material. The fiber-reinforced material comprises a long fiber molding compound is overmolded to a first (sleeve element) joining surface and to a second (bracket) joining surface. The first joining surface is a radially outer surface thereof. The long-fiber molding compound flows into a recessed portion of the first joining surface for mechanically locking the sleeve element to the composite body in an axial direction.

8 Claims, 3 Drawing Sheets

(51) Int. Cl.

| | | |
|---|---|---|
| *B60B 5/02* | (2006.01) | |
| *B60B 27/06* | (2006.01) | |
| *B29C 70/84* | (2006.01) | |
| *F16C 33/58* | (2006.01) | |
| *B29K 263/00* | (2006.01) | |
| *B29K 307/04* | (2006.01) | |
| *F16C 35/06* | (2006.01) | |
| *F16C 19/18* | (2006.01) | |

(52) U.S. Cl.
CPC ........ *B60B 27/0094* (2013.01); *B60B 27/065* (2013.01); *F16C 33/581* (2013.01); *F16C 33/586* (2013.01); *B29K 2263/00* (2013.01); *B29K 2307/04* (2013.01); *B60B 2310/321* (2013.01); *B60B 2900/111* (2013.01); *B60G 2206/50* (2013.01); *B60G 2206/71* (2013.01); *F16C 19/186* (2013.01); *F16C 35/06* (2013.01); *Y02T 10/86* (2013.01)

(58) Field of Classification Search
USPC ...................................... 403/265; 280/93.512
See application file for complete search history.

(56) References Cited

U.S. PATENT DOCUMENTS

| | | | |
|---|---|---|---|
| 2010/0001130 A1* | 1/2010 | Steinke | B29C 70/86 244/103 R |
| 2011/0056785 A1 | 3/2011 | Marquar et al. | |
| 2012/0049477 A1* | 3/2012 | Webster | B22D 18/04 280/93.512 |
| 2012/0163905 A1* | 6/2012 | Bond | B29C 70/30 403/265 |
| 2017/0210418 A1* | 7/2017 | Sakuma | B62D 7/18 |

FOREIGN PATENT DOCUMENTS

| | | | | |
|---|---|---|---|---|
| GB | 2473007 A | | 3/2011 | |
| WO | WO-2015017856 A1 | * | 2/2015 | ............ B22D 19/02 |

* cited by examiner

LIGHTWEIGHT STEERING KNUCKLE

CROSS REFERENCE TO RELATED APPLICATIONS

This is a United States National Stage Application claiming the benefit of International Application Number PCT/EP2014/061882 filed on 6 Jun. 2014, which claims the benefit of Europe (EP) Patent Application PCT/EP2013/061790 filed on 7 Jun. 2013, both of which are incorporated herein by reference in their entireties.

FIELD OF THE INVENTION

The present invention relates to a steering knuckle that is at least partly made from a fiber-reinforced composite material.

BACKGROUND TO THE INVENTION

In the interests of fuel economy, there is an increasing drive within the automotive industry towards weight reduction of the component parts of vehicles. One such component is the steering knuckle, which connects the wheel bearing to the vehicle suspension. Typically, steering knuckles are made of cast iron and consequently, there is potential for weight savings by manufacturing the knuckle from a lightweight material such as fiber-reinforced polymer.

An example of such a steering knuckle is disclosed in DE102007053120 A1. The steering knuckle is formed from a laminar textile comprising fibers bound in a matrix.

There is still room for improvement.

SUMMARY OF THE INVENTION

The present invention resides in a steering knuckle as specified in claim 1, whereby the dependent claims describe advantageous embodiments and further developments of the invention.

The steering knuckle comprises a bearing connection interface for connecting a wheel bearing to the steering knuckle and comprises further connection interfaces for connecting the steering knuckle to an upper and a lower control arm of a vehicle suspension. The bearing connection interface is formed by a sleeve element, whereby a bore of the sleeve element is adapted to receive an outer ring of the wheel bearing or is adapted to serve as the outer ring. Each further connection interface is formed by a bracket for connection of a ball joint. The sleeve element and the bracket are joined via a composite body comprising a fiber-reinforced material. According to the invention, the fiber-reinforced material comprises a long-fiber molding compound that is over molded to a first joining surface on the sleeve element and to a second joining surface on the bracket, whereby the first joining surface is a radially outer surface of the sleeve element. In addition, the first joining surface is provided with a recessed portion into which the long-fiber molding compound flows, for mechanically locking the sleeve element to the composite body in an axial direction.

The use of a long-fiber molding compound enables the geometry of the composite body of the knuckle to be accurately formed in a straightforward manufacturing process. Further, long-fiber molding compounds have excellent mechanical properties, which provide the steering knuckle with the necessary strength and stiffness to withstand the application forces.

The long fiber molding compound comprises fibers with a length of 5-50 mm, embedded in a polymer matrix. Suitable materials for the fibers include glass, carbon, aramid, PBO (polybenzoxazole) and HDPE (high-density polyethylene). Suitable matrix materials include epoxy resin, phenolic resin, bismaleimide resin, polyimide resin, and thermoplastic polymer material.

In use, a variety of forces act on the knuckle. The largest forces are the wheel forces, which are transferred to the knuckle through the wheel bearing. It is therefore important that the bearing connection interface, formed by the sleeve element, is robustly joined to the composite body of the knuckle. The recessed portion in the joining surface of the sleeve element helps to ensure a robust connection.

Preferably the recessed portion is a continuous annular groove, to maximize the volume of the composite body that is recessed relative to a maximum outer diameter of the sleeve element. Advantageously, the annular groove has a first curved portion and a second curved portion at first and second axial peripheries of the annular groove. The curved portions have a smooth curvature, which prevents the occurrence of stress concentrations.

In a first embodiment the sleeve element is made of e.g. steel and has a bore for receiving the outer ring of the wheel bearing. In a second embodiment, the sleeve element serves as the bearing outer ring. Preferably, the sleeve element is then made of a bearing grade steel, whereby at least a radially inner surface of the sleeve element has a hardened portion for forming a raceway for at least one row of rolling elements. A sleeve element that serves as the bearing outer ring may also be made from a suitable ceramic material or from titanium.

In one example of the second embodiment, the wheel bearing is a double-row angular contact ball bearing and the radially inner surface of the outer ring has first and second angular raceways for first and second rows of balls. Advantageously, the outer ring may be a sleeve element with a constant thickness, which is deformed in a rolling operation. The rolling of the sleeve element, to create the first and second angular raceways at the radially inner side, then automatically generates the continuous annular groove in the joining surface with first and second curved portions.

The forces acting on the knuckle are transmitted to the vehicle suspension mainly via the connection interfaces for the upper and lower control arms. It is therefore important that each bracket is robustly joined to the composite body.

Suitably, each bracket comprises a plurality of stub portions with a centre axis that is radially displaced relative to the first joining surface of the sleeve element. The second joining surface is formed by a radially outer surface of each stub portion. In one example, each bracket has three stub portions. Thus, the second joining surface has a large surface area, which facilitates the connection with the overmolded composite body.

Preferably, the plurality of stub portions are arranged circumferentially at even intervals around a vertical axis. This distributes the load on the further connection interface and avoids stress concentrations that could damage the composite body. The stub portions may be formed by individual inserts that are held in the mould at appropriate locations. In this case, each stub portion suitably has a threaded hole to enable the connection of the ball joint. Furthermore, to mechanically lock each individual insert to the composite body, the radially outer surface (second joining surface) of each stub portion is provided with a recess such as a continuous groove, as described above.

Preferably, each bracket is a single piece in which the plurality of stub portions are joined together by a connection part with radially extending surfaces. This makes it easier to position the bracket in the mould and provides for mechanical locking of the bracket to the composite body. The single-piece bracket may further comprises a tubular element for receiving a stem of the ball joint, whereby the tubular element has a centre axis that coincides with the vertical axis.

In a further development of the invention, the first joining surface and/or the second joining surface are subjected to a roughening process, prior to overmolding. The roughening process may include knurling or lettering and creates a surface texture that increases the surface area of the joining surface. Furthermore, fibers of the long-fiber molding compound will enter into indentations in the surface texture, to improve the strength and stiffness of the interface between the composite body and the joining surface.

Other advantages of the present invention will become apparent from the detailed description and accompanying drawings.

BRIEF DESCRIPTION OF THE DRAWINGS

The invention will now be described further, with reference to the following Figures, in which.

DETAILED DESCRIPTION OF THE PRESENT INVENTION

Figure 1A:
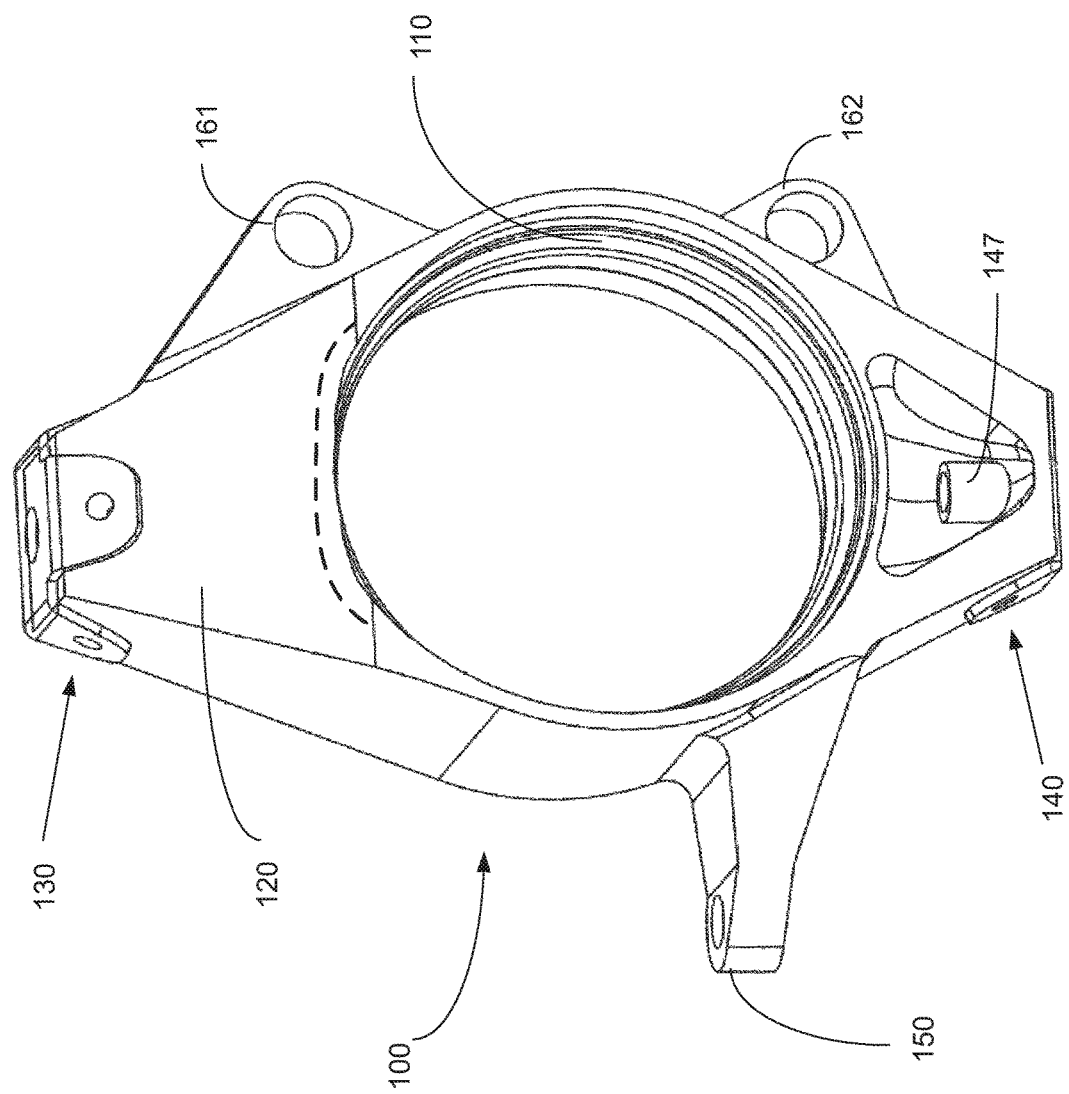
FIG. 1 shows a perspective view of an example of a steering knuckle according to the invention comprising a composite body molded to a bearing outer ring and upper and lower brackets.
FIGS. 1b and 1c respectively show a side view and a perspective view of the bearing ring.
FIG. 1d shows a perspective view of the upper bracket.

An example of a steering knuckle according to the invention is shown in FIG. 1a. The knuckle 100 comprises a bore for receiving a wheel bearing unit. The bore is formed in a sleeve element 110, which serves as the bearing outer ring and is made of a bearing-grade steel. The outer ring 110 will form part of a double-row angular contact bearing, and has first and second angular raceways 116, 117 (refer FIG. 1c). The knuckle further comprises a composite body 120 that is made of a long fiber molding compound comprising e.g. carbon fibers in an epoxy resin matrix. In addition to the bore for connection of the wheel bearing, the knuckle 100 comprises a number of further connection interfaces. In use, the knuckle is mounted to a vehicle suspension via an upper control arm, a lower control arm and a steering arm. The upper and lower control arms are connected via a ball joint, and the knuckle 100 comprises a corresponding upper bracket 130 and a lower bracket 140, which in the depicted example comprise a tubular portion 147 for receiving a stem of the ball joint. The steering arm is connected to the knuckle 100 at an intermediate connection interface 150. At an opposite side from the connection interface 150, the knuckle further comprises first and second connection interfaces 161, 162 for attaching a brake caliper device to the knuckle.

In use, a variety of forces act on the knuckle. The largest forces are the wheel forces, which are transferred to the knuckle through the bearing unit. These forces are transferred to the vehicle suspension mainly through the upper and lower connection interfaces 130, 140, via the composite knuckle body 120, which is formed by molding the long-fiber molding compound to the bearing outer ring and to the brackets. It is therefore important that the bearing ring 110 and the upper and lower brackets 130, 140 are securely embedded within the composite body.

Figure 1C:
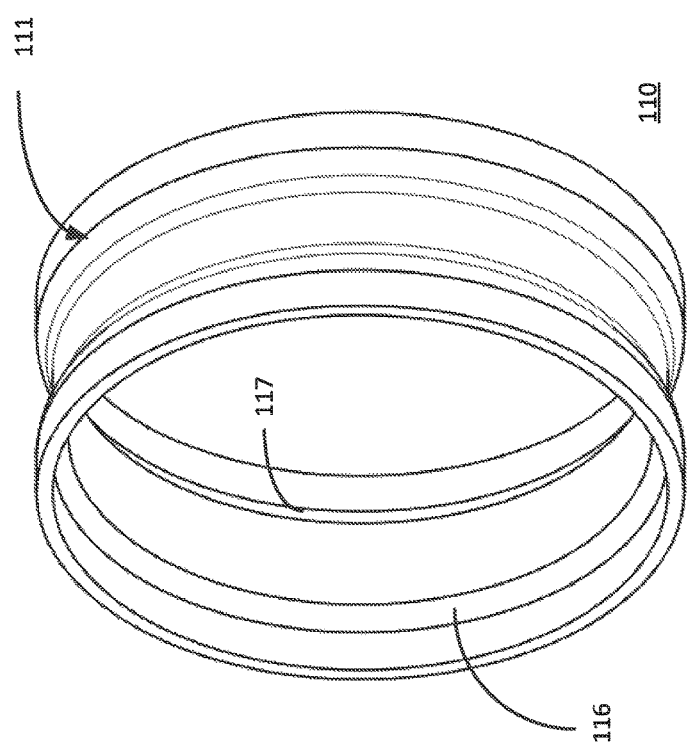
Figure 1B:
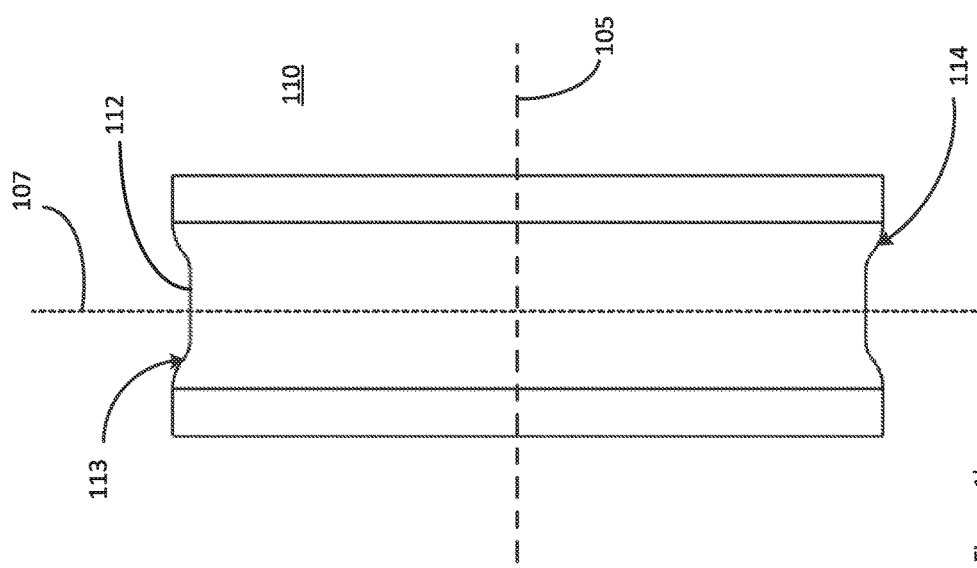

The outer ring is shown in more detail in FIGS. 1b and 1c. The outer ring 110 has an axial centerline 105 and has a radially outer surface 111 to which the composite knuckle body 120 is overmolded. This radially outer surface will be referred to as a first joining surface 111 and comprises a recessed portion in the form of an annular groove 112. The overmolded long-fiber molding compound will flow into the groove, to mechanically lock the bearing ring 110 to the composite body in an axial direction. To further improve the strength and stiffness of the interface between the outer ring 110 and the composite body 120, the first joining surface 111 is roughened to create a surface texture. The surface may be knurled or lettered. This increases the surface area of the joining surface 111 and creates indentations into which the fibers of the molding compound can enter.

In the depicted example, the outer ring 110 is formed from a cylinder having a constant thickness which is deformed in order to create the annular groove 112. At first and second axial sides of an axial midplane 107 through the bearing ring 110, the annular groove has a first curved portion 113 and a second curved portion 114. Suitably the first and second portions have a smooth curvature in order to avoid stress concentrations.

Advantageously, the curvature is selected such that the radially inner side of the outer ring 110 has correspondingly curved first and second surfaces which form the first 116 and second 117 angular raceways for first and second rows of balls.

Figure 1D:
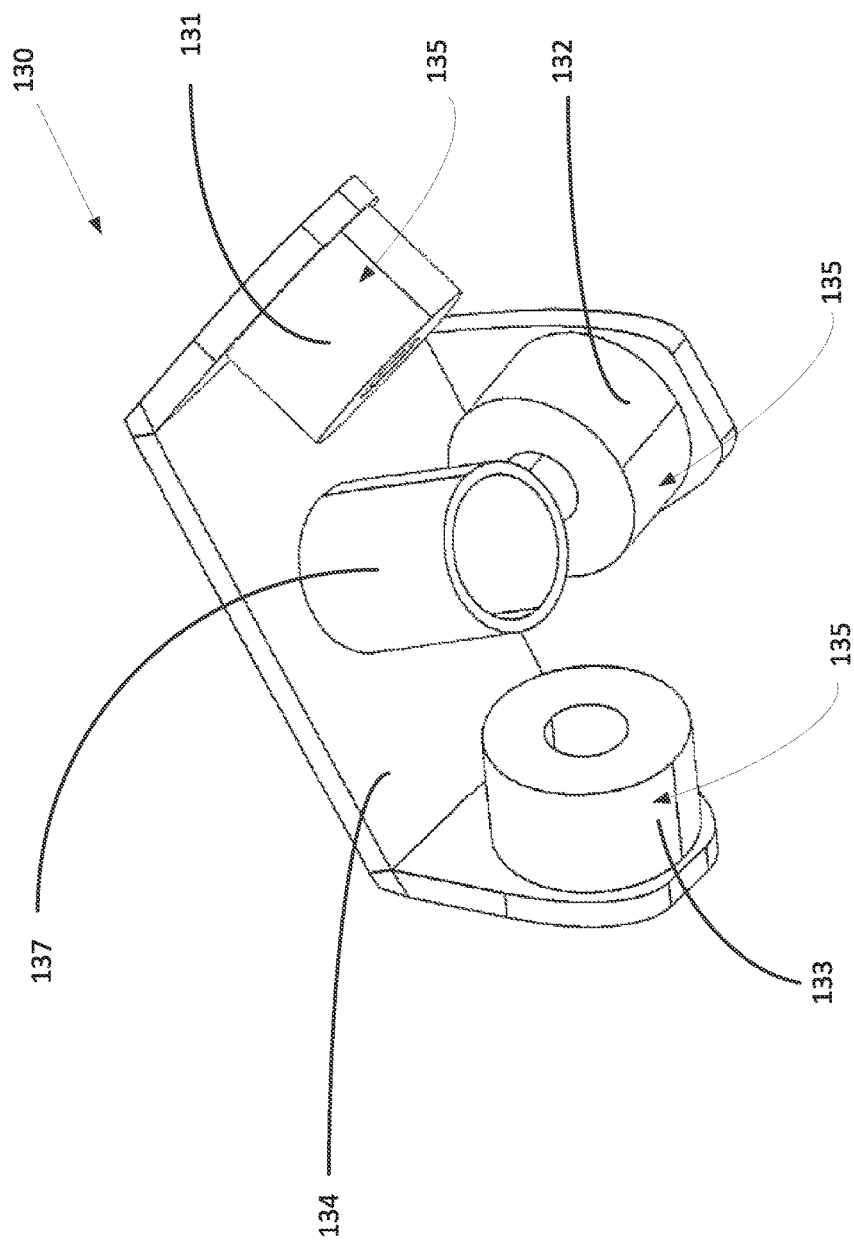

As mentioned, a robust join between the composite body and the upper and lower brackets is also important for ensuring that the knuckle is able to withstand the application forces. A perspective view of the upper bracket 130 is shown in FIG. 1d. The bracket comprises a tubular part 137 for receiving the stem of a ball joint. The part 137 may be threaded, may have a tapered bore, or may have a straight bore such that the ball joint stem can be bolted to the bracket 130. A centre axis of the tubular part 137 is perpendicular to or translationally perpendicular to the centre axis 105 of the bearing. To ensure that the bracket 130 is securely embedded within the composite body 120, the bracket has three stub portions 131, 132, 133, which are arranged circumferentially around the tubular part 137 at regular intervals. As a result, reaction forces on the composite body 120 from the upper control arm, which are transmitted via the upper bracket 130, are evenly distributed.

Each stub portion has a centre axis, which is radially displaced from the first joining surface 111. The composite body 120 is molded to a radially outer surface 135 of each stub portion, which together form a second joining surface of the bracket 130. The second joining surface therefore has a large surface area and radially locks the bracket 130 to the composite body 120. Axial locking is provided in that the stub portions 131, 132, 133 are joined to the tubular part 137 by a connection element 134 of the bracket. In the depicted example, the bracket 130 is a single piece, which facilitates the positioning of the bracket during the overmolding of the composite body.

The second joining surface 135 is also roughened to improve the strength and stiffness of the interface between the bracket and the composite body.

A steering knuckle according to the invention is thus a lightweight and robust component.

A number of aspects/embodiments of the invention have been described. It is to be understood that each aspect/ embodiment may be combined with any other aspect/embodiment. Moreover the invention is not restricted to the described embodiments, but may be varied within the scope of the accompanying patent claims.

The invention claimed is:

1. A steering knuckle comprising:
   a bearing connection interface for connecting a wheel bearing to the steering knuckle, and
   comprising a further connection interface for connecting the steering knuckle to one of an upper control arm or a lower control arm of a vehicle suspension,
   wherein the bearing connection interface is formed by a sleeve element, whereby a bore of the sleeve element is adapted to one of (a) receive an outer ring of the wheel bearing or (b) serve as the outer ring;
   wherein the further connection interface is formed by a bracket for connection of a ball joint; and
   wherein the sleeve element and the bracket are joined via a composite body comprising a fibre-reinforced material,
   wherein the fibre-reinforced material comprises a long-fibre moulding compound that is overmolded to a first joining surface on the sleeve element and to a second joining surface on the bracket, whereby the first joining surface is a radially outer surface of the sleeve element; and
   wherein the first joining surface is provided with a recessed portion into which the long-fibre moulding compound flows, for mechanically locking the sleeve element to the composite body in an axial direction, wherein the recessed portion is a continuous circular groove.

2. The steering knuckle according to claim 1, wherein the continuous circular groove has a first curved portion and a second curved portion at first axial periphery and second axial periphery of the continuous circular groove.

3. The steering knuckle according to claim 2,
   wherein the wheel bearing is a double-row angular contact bearing; and
   wherein the sleeve element serves as the bearing outer ring and has a substantially constant thickness, such that a radially inner surface of the outer ring has a corresponding first curved portion and a corresponding second curved portion,
   wherein the corresponding first curved portion and the corresponding second curved portion form part of a first outer raceway and a second outer raceway for a first row of rolling elements and a second row of rolling elements.

4. The steering knuckle according claim 1, wherein the bracket further comprises a plurality of stub portions with a center axis that is radially displaced relative to the first joining surface, and
   wherein the second joining surface is formed by a radially outer surface of each stub portion.

5. The steering knuckle according to claim 4,
   wherein the plurality of stub portions are arranged circumferentially around a vertical axis that is parallel to an axial midplane of the sleeve element.

6. The steering knuckle according claim 4, wherein the bracket further comprises a tubular element for receiving a stem of the ball joint,
   wherein the stub portions are arranged circumferentially around the tubular element.

7. The steering knuckle according to claim 4, wherein each of the plurality of stub portions further includes internal thread.

8. The steering knuckle according to claim 1, wherein at least one of the first joining surface and the second joining surface is roughened in order to create a surface texture.

* * * * *